US012074958B2

(12) United States Patent
Giacalone et al.

(10) Patent No.: US 12,074,958 B2
(45) Date of Patent: Aug. 27, 2024

(54) SYSTEMS AND METHODS FOR MULTI-CLIENT CONTENT DELIVERY

(71) Applicant: DK Crown Holdings Inc., Boston, MA (US)

(72) Inventors: Nathan Giacalone, Cambridge, MA (US); Ryan McCullough, Reading, MA (US); Sumanth Reddy, Cambridge, MA (US); Brandon Ward, Somerville, MA (US); Andrew Busch, Waltham, MA (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 18/222,285

(22) Filed: Jul. 14, 2023

(65) Prior Publication Data

US 2023/0362278 A1 Nov. 9, 2023

Related U.S. Application Data

(63) Continuation of application No. 17/470,317, filed on Sep. 9, 2021, now Pat. No. 11,736,592, which is a
(Continued)

(51) Int. Cl.
*H04L 67/62* (2022.01)
*H04L 7/00* (2006.01)
(Continued)

(52) U.S. Cl.
CPC ............ *H04L 67/62* (2022.05); *H04L 7/0054* (2013.01); *H04L 7/0079* (2013.01); *H04L 69/28* (2013.01); *H04L 67/01* (2022.05)

(58) Field of Classification Search
CPC ..... H04L 67/62; H04L 7/0054; H04L 7/0079; H04L 69/28; H04L 67/01
See application file for complete search history.

(56) References Cited

U.S. PATENT DOCUMENTS

| 5,790,805 A | 8/1998 | Bantum |
| 9,867,004 B2 | 1/2018 | Aldana et al. |

(Continued)

OTHER PUBLICATIONS

International Preliminary Report on Patentability on PCT Appl. No. PCT/US2020/067458 mailed Jul. 14, 2022.
(Continued)

*Primary Examiner* — Kristie D Shingles
(74) *Attorney, Agent, or Firm* — Foley & Lardner LLP

(57) ABSTRACT

In some aspects, the disclosure is directed to methods and systems for synchronized multi-client content delivery, and a content selection system based on individual and aggregated scores for the content items, to generate bundles or sets of content items having approximately corresponding scores. Server timers and local timers on client devices may be synchronized via notifications, and timer durations dynamically adjusted when client requests and responses are sent prior to client-side timer expiration, but received after server-side timer expiration, indicating communication latency has caused desynchronization. Timers may be adjusted on a global basis or per-client device basis. Through scoring and bundling, sets of content items that may be relevant to approximately an equal share of the recipient client devices may be selected and transmitted.

20 Claims, 7 Drawing Sheets

Related U.S. Application Data continuation of application No. 16/732,004, filed on Dec. 31, 2019, now Pat. No. 11,172,049.

(51) Int. Cl.
*H04L 69/28* (2022.01)
*H04L 67/01* (2022.01)

(56) References Cited

U.S. PATENT DOCUMENTS

| | | |
|---|---|---|
| 2009/0083372 A1 | 3/2009 | Teppler |
| 2010/0106842 A1 | 4/2010 | Cosmadopoulos et al. |
| 2015/0180963 A1 | 6/2015 | Luecke et al. |
| 2016/0337426 A1 | 11/2016 | Shribman et al. |
| 2018/0332434 A1 | 11/2018 | Kulkarni et al. |
| 2020/0044760 A1 | 2/2020 | Seed et al. |
| 2020/0162796 A1* | 5/2020 | Azuolas ............... H04L 65/65 |
| 2020/0191943 A1* | 6/2020 | Wu ..................... G01S 13/726 |

OTHER PUBLICATIONS

International Search Report and Written Opinion on PCT Appl. No. PCT/US2020/067458 mailed Jun. 21, 2021.

Lee Giwon et al: "Fog-Assisted Aggregated Synchronization Scheme for Mobile Cloud Storage Applications", IEEE Access, vol. 7, May 2, 2019 (May 2, 2019), pp. 56852-56863.

Non-Final Office Action on U.S. Appl. No. 17/470,317 dated Dec. 23, 2022.

Non-Final Office Action on U.S. Appl. No. 16/732,004 dated Mar. 26, 2021.

Notice of Allowance on U.S. Appl. No. 17/470,317 dated Apr. 3, 2023.

Notice of Allowance on U.S. Appl. No. 16/732,004 dated Jul. 19, 2021.

Partial International Search Report on PCT Appl. No. PCT/US2020/067458 mailed Apr. 30, 2021.

Office Action on CA Appl. No. 3166394 dated Nov. 9, 2023.

\* cited by examiner

SYSTEMS AND METHODS FOR MULTI-CLIENT CONTENT DELIVERY

CROSS-REFERENCE TO RELATED APPLICATIONS

This application is a continuation of and claims priority to U.S. patent application Ser. No. 17/470,317, filed Sep. 9, 2021, entitled "SYSTEMS AND METHODS FOR MULTI-CLIENT CONTENT DELIVERY," which is a continuation of and claims priority to U.S. patent application Ser. No. 16/732,004, filed Dec. 31, 2019, entitled "SYSTEMS AND METHODS FOR MULTI-CLIENT CONTENT DELIVERY," the contents of which is incorporated herein by reference in its entirety.

FIELD OF THE DISCLOSURE

This disclosure generally relates to systems and methods for multi-device communications. In particular, this disclosure relates to systems and methods for content delivery to one or more client devices.

BACKGROUND OF THE DISCLOSURE

A content delivery system may provide content items to a large number of client devices simultaneously. In many instances, it may be acceptable to provide this content in an asynchronous or unsynchronized manner, but in implementations in which communication or feedback from the client devices is related to the content delivery, it may be important to synchronize timing and delivery of content amongst the client devices. However, this may be difficult due to differences in round trip latency in network connections to each device. While in some instances, this latency may be on the order of tens or hundreds of milliseconds, in timing-crucial utilizations, such delays may nonetheless result in dropped or lost communications, errors, or other undesirable effects. Even implementations of multicasting protocols do not address such synchronization issues, as synchronized return communications from client devices are usually not implemented or required.

Additionally, in predictive content selection systems, content items may be selected for delivery based on requests from or characteristics associated with a single client device. However, with multiple client devices receiving the same content in synchronization, selecting content for delivery may become complex and unwieldy. In particular, selecting content that is relevant to equal proportions of the plurality of client devices may be unpracticable as the number of client devices increases.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
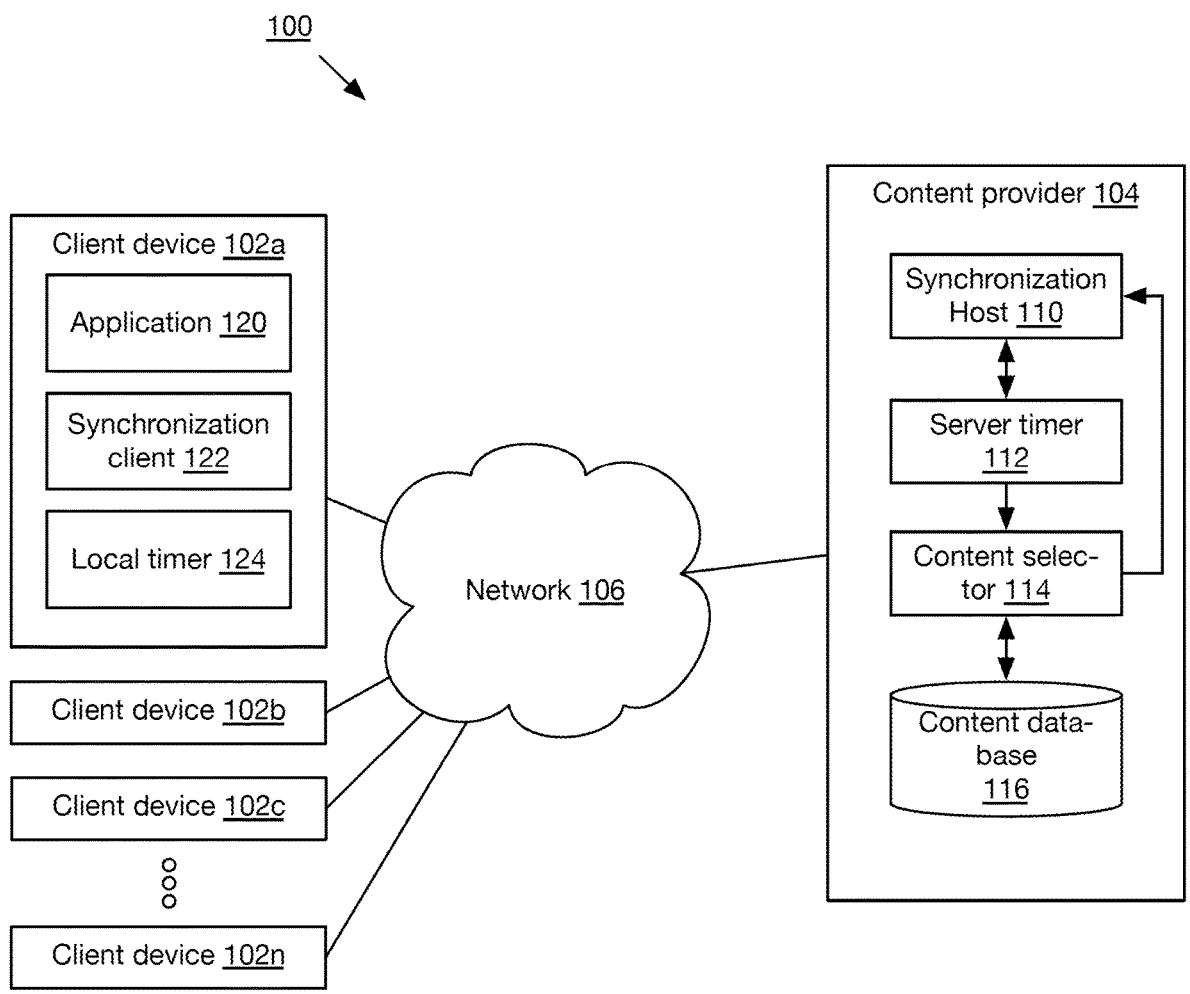
FIG. 1 is a block diagram of an implementation of a system for multi-client content delivery.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for multi-client content delivery; and Section B describes a network environment and computing environment which may be useful for practicing embodiments described herein.

A. Multi-Client Content Delivery

A content delivery system may provide content items to a large number of client devices simultaneously, frequently as many as thousands, tens of thousands, hundreds of thousands, or more. In many instances, it may be acceptable to provide this content in an asynchronous or unsynchronized manner (e.g., via hypertext transport protocol (HTTP) transfers of media chunks, as in HTTP live streaming (HLS); via file transfers such as the file transfer protocol (FTP), etc.). In implementations in which communication or feedback from the client devices is related to the content delivery, it may be important to synchronize timing and delivery of content amongst the client devices. However, this may be difficult due to differences in round trip latency in network connections to each device. While in some instances, this latency may be on the order of tens or hundreds of milliseconds, in timing-crucial utilizations (e.g. where feedback or responses from client devices is tracked or timed, or where arrival time or order of responses matter such that a client device with a lower latency communication link would have a significant advantage over a client device with a higher latency communication link), such delays may nonetheless result in dropped or lost communications, errors, or other undesirable effects. This can occur in instances as diverse as multi-user access to online data or documents (potentially resulting in race conditions), multi-user applications, stock trading or auctions, online multiplayer gaming and Esports, etc. Even implementations of multicasting protocols such as user datagram protocol (UDP) multicasting do not address such synchronization issues, as communications are still affected by individual connection latencies, and synchronized return communications from client devices are usually not implemented or required with such protocols (e.g. the UDP protocol not utilizing packet acknowledgments).

Instead, via implementations of the systems and methods discussed herein, server timers and local timers on client devices may be synchronized via notifications, and timer durations dynamically adjusted when client requests and responses are sent prior to client-side timer expiration, but received after server-side timer expiration, indicating communication latency has caused desynchronization. Timers may be adjusted on a global basis or per-client device basis, allowing the system to dynamically adjust between individual device latencies, ensuring overall synchronization and preventing unfairness favoring devices with lower round trip latency connections.

FIG. 1 is a block diagram of an implementation of a system 100 for synchronized multi-client content delivery. As shown, a plurality of client devices 102a-102n (referred to generally as client device(s) 102) may communicate via a network 106 with one ore more content provider servers 104 (referred to generally as content providers, servers, hosts, or by other similar terms).

Client devices 102 may comprise any type and form of computing device operating on behalf of or under control of a user, such as a mobile device, tablet device, smart phone, wearable device, embedded device, Internet-of-Things (IoT) device, or other such device. As discussed in more detail below, a client device 102 may comprise processor circuitry for executing an application 120, a memory device or other storage device for storing application 120 for execution as well as assets or content retrieved for use by application 120, a network interface for communicating via one or more networks 106, and/or one or more input/output interfaces, such as a touchscreen, monitor, joystick, keyboard, mouse, or other such interface hardware, as well as combinations of this or other hardware. In many implementations, many thousands or millions of client devices 102 may be present in the system.

Content provider 104 may comprise any type and form of server computing device provided by or operating on behalf of a content publisher or distributor, such as an application store or software repository, web server, asset server, media server, data store, application server, or other such device. Content provider 104 may comprise one or more desktop computers, server computers, rackmount computers, or other physical computers, and may be deployed as a server farm or cloud of virtual computers executed by one or more physical computing devices. Content provider 104 may comprise a memory device or data store storing a content database 116, which may be internal to content provider 104 and/or provided by an external device (e.g. network storage device, or other such device, including virtual storage devices provided by one or more physical computing devices). Content database 116 may store one or more content items for transmission to client devices 102, such as applications, media items, data files, images, text, web pages, interactive content, executable scripts for execution within a browser application or other such application, or any other type and form of content. Although shown as a single device, in many implementations as discussed above, content provider 104 may comprise a plurality of computing devices, including processing devices, storage devices, network devices (e.g. switches, accelerators, load balancers, etc.).

Network 106 may comprise a local area network (LAN), wide area network (WAN) such as the Internet, satellite network, cellular network, broadband network, or any combination of these or other networks. Network 106 may comprise many individual devices, such as gateways, switches, hubs, firewalls, access points, network accelerators, or other such devices (not illustrated).

Content provider 104 may comprise or execute a synchronization host 110. Synchronization host 110 may comprise an application, service, server, daemon, routine, or other executable logic for providing synchronization notifications via network 106 to client devices 102, and for managing (e.g. adjusting, resetting, initiating, monitoring, etc.) a server timer 112. Synchronization notifications may be provided in any suitable protocol (e.g. transport layer, network layer, session layer, or application layer protocols, such as via an application layer protocol such as a simple network management protocol (SNMP), HTTP, a real time protocol (RTP), etc.; or via a lower layer protocol, such as via an options field of a transport layer header of a packet). Notifications may comprise an indication to start a local timer on a client device 102. In some implementations, notifications may comprise a duration of the timer to be started, and/or may include a length or duration of an offset to add to a predetermined timer duration (e.g. 50 milliseconds, 20 milliseconds, 150 milliseconds, or any other such value).

Server timer 112 may comprise a timer maintained by the content provider 104 and set to any predetermined value or duration, such as 1 second, 10 seconds, 15 seconds, 1 minute, or any other such value, and may be dynamically adjusted by synchronization host 110, e.g. in response to measurements of latency of communications to client devices 102.

In some implementations, synchronization host 110 may direct a content selector 114 to select and/or provide content to a plurality of client devices 102 (e.g. upon initiation of a server timer 112, in some implementations); or in some implementations, content selector 114 may monitor server timer 112 and transmit content items to client devices upon detecting initiation of server timer 112. In some implementations, content items may be selected in advance of timer initiation (e.g. and queued for transmission upon initiation of the timer).

Client devices 102 may execute one or more applications 120, which may comprise any type and form of application, including a web browser, local application, hosted application, applet or script within another program, media player, social network application, video game application, or any other type and form of application. In some implementations, application 120 may be obtained from a content provider 104 (e.g. downloaded and executed by client device 102, or hosted by content provider 104 and provided remotely such as via a remote desktop application or a web application accessed via a web browser application). Application 120 may receive (or retrieve, in some implementations), one or more content items from content provider 104 and display or render the content items for a user of the client device. In some implementations, application 120 may receive input or selections from the user (e.g. selections of one or more content items, such as a set of content items), and may transmit an identification of the input or selections to content provider 104 and/or content selector 114. For example, in some implementations, application 120 may receive a plurality of content items; display the content items; receive a user selection of a first content item; and transmit an identification of selection of the first content item to the content provider 104. Input may be received by application 120 via any suitable input device of client device 102, such as a mouse, keyboard, joystick, touchscreen, eye-tracker, microphone, accelerometer, or other such input device.

Client devices 102 may execute a synchronization client 122, either as part of application 120 (e.g. a plug-in in a web browser, a sub-routine of an application, etc.) or separately. Synchronization client 122 may receive a notification from a synchronization host 110 and initiate a local timer 124. As discussed above, the local timer 124 may be set to a predetermined duration, or the notification may identify a duration or an offset to add to a predetermined duration. As discussed above, in some implementations, each client device may receive an offset for said client device's local timer. Synchronization client 122 may also monitor local timer 124 for an expiration. In some implementations, upon expiration, synchronization client 122 may transmit a notification or request to content provider 104. In other implementations, to reduce network bandwidth, synchronization client 122 may not transmit notifications or requests upon expiration of the timer.

As discussed above, in some implementations, application 120 may be used for receiving, displaying, and selecting content items from a plurality of content items. In some implementations, selecting content items may only be enabled during a period in which local timer 124 is running (e.g. initiated and not yet expired). Thus, upon initiation of the local timer 124, application 120 may monitor an input device for inputs indicating a selection of one or more items of content. If a selection is detected and local timer 124 has not yet expired, then application 120 may transmit an identification of the selection to content provider 104. The transmission may also include a present value of the local timer 124 in some implementations. If the local timer 124 has expired, then in some implementations, no identification of the selection may be transmitted (and in some implementations, application 120 may cease monitoring for an input selection).

Client devices 102 and content provider 104 may each include other components not illustrated in FIG. 1, including processors, network interfaces, memory devices, input/output devices, operating systems, graphics processors, or other such devices, as discussed below in connection with FIG. 6.

Figure 2:
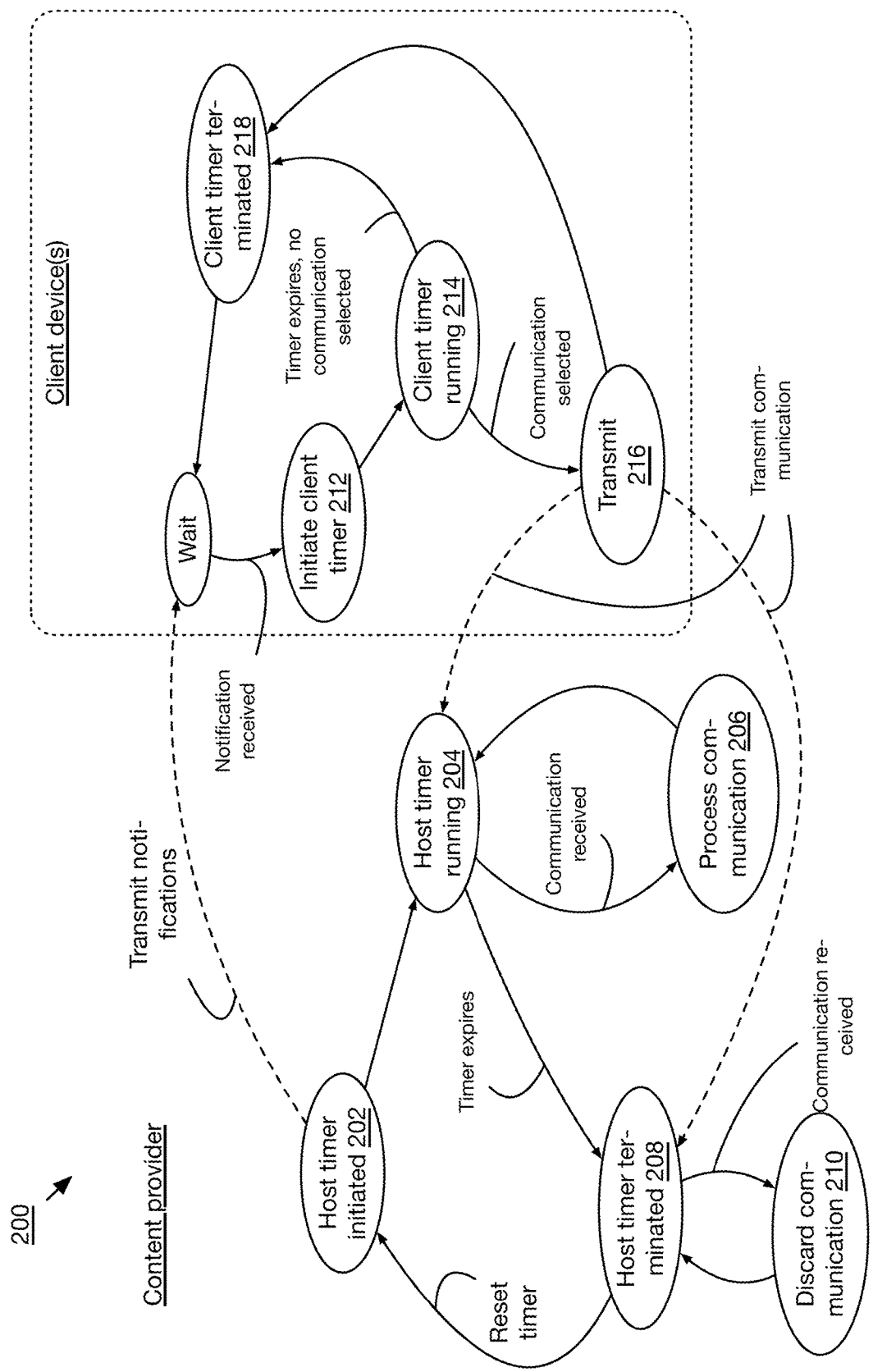
FIG. 2 is a state diagram of an implementation of a system for multi-client synchronization for content delivery.

FIG. 2 is a state diagram 200 of an implementation of a system for multi-client synchronization for content delivery. As shown, states 202-210 represent states of the content provider, while states 212-218 represent states of a client device (surrounded by the dotted box); dashed arrows represent communications between the content provider and client device.

At state 202, the content provider may initiate the host or server timer (e.g. in response to a reset command, or after expiration of a previous round running the timer). In state 204, the host or server timer may run, and the content provider may wait for incoming communications from client devices. If a communication is received from a client device (e.g. a selection of an item of content, a request for data, etc.), the content provider may transition to state 206 and process the communication. The content provider may then return to state 204, while the timer continues to run. In some implementations, processing communications in state 206 may comprise queueing the communications for subsequent processing (e.g. after expiration of the timer). This may be done to free up resources for monitoring for incoming communications during running of the timer, or in some implementations to ensure that received communications are processed in a fair manner (e.g. via a random selection, round robin, or other method) rather than in a first-come, first-served manner. For example, in some implementations, all communications received within a particular timer window or duration may be queued and subsequently processed in random order, thus rendering any latency differences between the communications irrelevant. In such implementations, subsequent processing may occur as part of state 208, after termination of the timer.

From state 204, upon expiration of the timer, the content provider transitions into state 208. In some implementations, if communications from client devices are received after expiration of the timer, at state 210, the communications may be discarded as "too late" or being received after the timer window. In some instances, this may be due to latency, such as a communication being sent shortly before the end of the timer duration (for example, as discussed above, in some implementations, a local timer on the client device must not have expired in order to detect a selection and/or send a communication to the content provider), but due to network delays, being received after expiration of the server or host timer. In some implementations, a difference in time between the expiration of the timer and receipt of the communication may be added as an offset to the timer (e.g. the server or host timer; and/or the client device(s) local timer(s), such as via an offset value in a subsequent timer notification message). Accordingly, the content provider may dynamically adjust its timer or the client device timers to account for network delays, recovering synchronization of timer periods.

As shown, from state 202, initiating the timer, the content provider may transmit notifications to client devices. The client devices may be in an initialization or "waiting" state, and upon receipt of the notifications, may transition into state 212 by initiating a local timer on the client. As discussed above, in some implementations, the notification may identify a duration for the timer (e.g. 15 seconds, or any other such value) or may identify an offset (e.g. 50 milliseconds, or any other such value) to be added to a predetermined duration of the timer. While running, the client device may monitor an input device of the client device for selections, triggers of communications, or other such input. If a selection or input is detected, then the client may transition to state 216 and transmit a communication to the content provider. After transmitting the communication, then at state 218, the client device may terminate the timer and then return to the waiting state. Similarly, if no input is detected and the timer expires, then at state 218, the client device may terminate the timer and then return to the waiting state.

As discussed above, the communication from the client device may be transmitted while the local timer is running, but may be received while the server timer is running (in state 204), or after the server timer has expired (in state 208), for example due to network latency. The communication may be processed or discarded, respectively, as discussed above.

Figure 3:
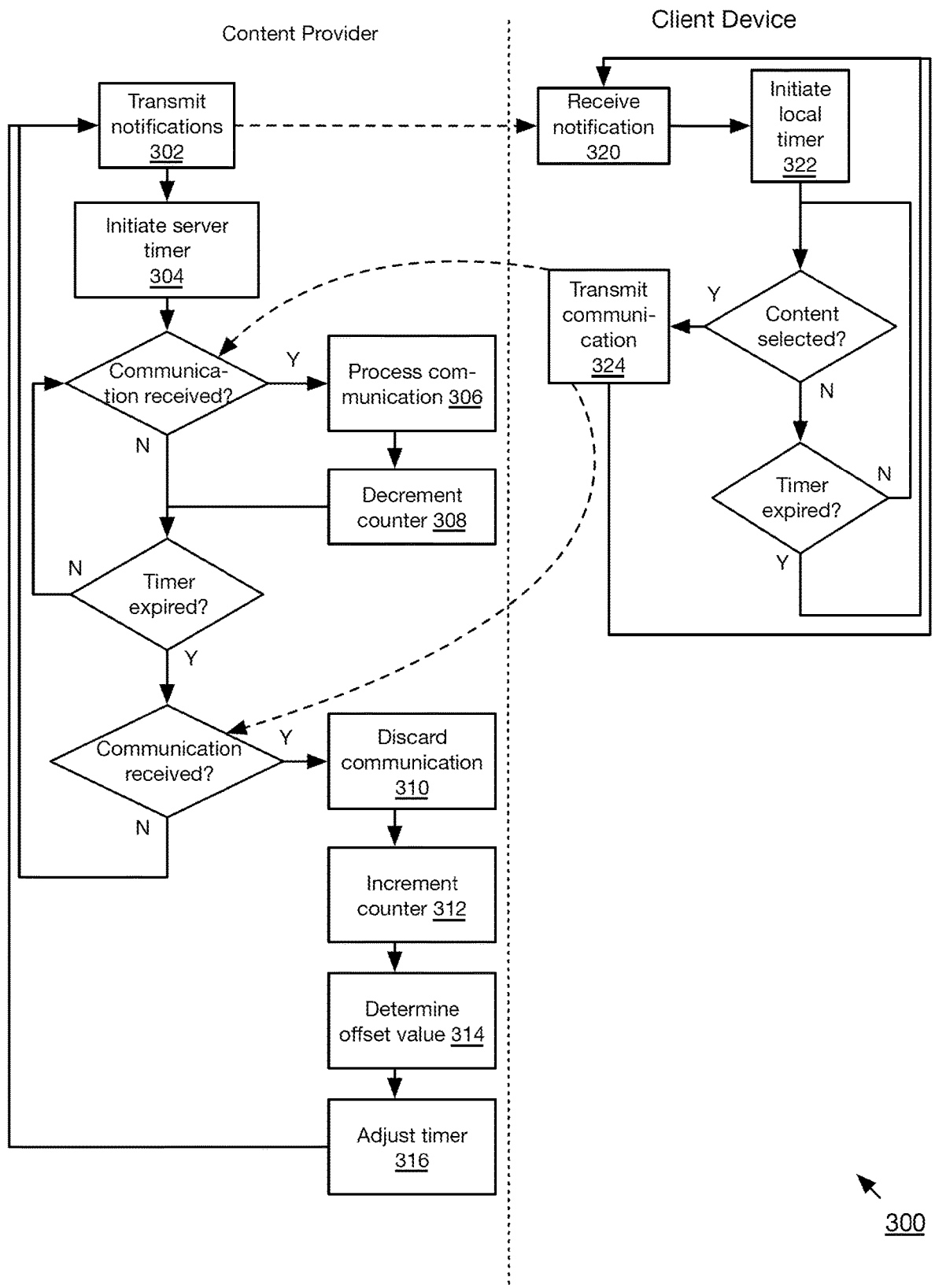
FIG. 3 is a flow chart of an implementation of a method for multi-client synchronization for content delivery.

FIG. 3 is a flow chart of an implementation of a method 300 for multi-client synchronization for content delivery. At step 302, a content provider may transmit notifications to one or more client devices via a network. The notifications may be transmitted via any suitable means (e.g. push notifications, representational state transfer (REST)ful requests, remote procedure calls, SNMP requests or commands, requests transmitted via a persistent web socket connection between the content provider and each client device, etc.). In some implementations, the notifications may include a timer duration, a timer offset value, both a timer duration and offset value, and/or a command to initiate a client timer. In some implementations, the notifications may include an absolute time of an event or trigger in the future, and the client device may set a local timer according to the absolute time (e.g. a notification may identify an event at an absolute time of 12:00:00, and if the present time according to a clock of the client device is 11:59:30, the client device may initiate a 30 second timer). In some implementations, the notifications may comprise a transmission time $t_1$ of the notifications, allowing client devices to determine an offset locally based on a difference between the transmission time and a receipt time $t_2$ of the notification (e.g. offset=$t_2-t_1$). In some implementations, the offset may be based on a one-way latency between the client device and content provider (e.g.

($t_2-t_1$)/2). This may be useful for adjusting event times provided by the content provider for triggering according to a local timer or clock. For example, in some such implementations, a client device may determine a one-way latency between the client device and content provider as discussed above (e.g. 2 seconds). The notifications from the content provider may comprise one or more event times (e.g. 12:00:00 for an event start and 12:00:10 for the event end or for triggering of a second event, etc.). The client device may adjust the times according to the offset (e.g. 11:59:58 and 12:00:08, respectively) such that if the client device transmits a request to the content provider at an adjusted time (e.g. 11:59:58), with the transmission latency, the request will be received by the content provider at the expected time for the event (e.g. 12:00:00). Similarly, if the event times comprise boundaries of an event window (e.g. 12:00:00 to 12:00:10), the client device may be able to transmit requests during the adjusted event window (e.g. 11:59:58 to 12:00:08), knowing that the requests will likely be received during the event window according to the content provider's local clock. At step 304, the content provider may initiate a server timer. In some implementations, step 304 may be performed before or simultaneously with step 302.

While the timer is running, the content provider may monitor for incoming communications (dashed line). If one is received, the content provider may process the communication at step 306 (or queue the communication for subsequent processing, as discussed above). In some implementations, the content provider may decrement a counter value corresponding to the client device that provided the communication at step 308. For example, the received communication may identify the client device (e.g. via IP address, unique identifier such as a MAC address, GUID, account name, device name, or other such identifier), and may decrement the value of a counter associated with the client device in a database or array maintained by the content provider. In some implementations, the communication may include a value, and the counter may be decremented an amount according to the value in the communication. The content provider may continue monitoring for incoming communications until the timer has expired.

Upon expiration of the timer, if a communication is received from client device prior to resetting the timer and returning to step 302, then at step 310, in some implementations, the communication may be discarded (e.g. after reading any relevant data for performing steps 312-316). At step 312, in some implementations, the content provider may increment a counter associated with the client device, responsive to discarding the communication. This may be done for example to provide a credit to a client device that transmitted a communication that was not received in time and was therefore discarded. In some implementations, the communication may include a value, and the counter may be incremented an amount according to the value in the communication.

At step 314, in some implementations, the content provider may determine an offset value based on a difference between when the server timer expired and when the client device's communication was received. In some implementations, the offset value may be twice this difference (e.g. to reflect a round trip time). In some implementations, the client device communication may include a transmission time set by the client device upon transmission. In some such implementations, the offset value may be a difference between a time of receipt and a transmission of time of the communication (or twice this difference, to represent round trip times). At step 316, in some implementations, the content provider may adjust the server timer according to the offset and/or generate one or more notifications for the client device and/or other client devices comprising the offset value or the adjusted timer duration (e.g. increased by the offset value). These notifications may be transmitted at the next iteration of step 302.

As discussed above, prior to step 302 in some implementations, the content provider may process queued communications received during the server timer window. These communications may be processed in order of receipt, in order of transmission time, randomly, or by any other such queueing means.

At step 320, the client device may receive the timer notification from the content provider. At step 322, the client device may initiate a local timer, responsive to receipt of the notification. In some implementations, the timer may be set to a predetermined duration, may be set to a duration included in the notification, or may be adjusted from a predetermined duration according to an offset value included in the notification. In some implementations, the notification may include a transmission time from the content provider. In some such implementations, the client device may adjust the duration of the local timer based on a difference (or twice the difference, in some implementations) between the transmission time of the notification and a receipt time of the notification (e.g. corresponding to the latency of the transmission path).

The client device may monitor for a content selection or other input indicating a communication should be transmitted. If no input is identified or detected prior to expiration of the timer, then the client device may reset the timer and wait until a notification is next received at step 320. If an input is detected (e.g. selecting a content item, or providing other such input), then at step 324, the client device may transmit a communication identifying the input (e.g. identifying the content item) to the content provider. The client device may then reset the timer and wait until a notification is next received at step 320.

In some implementations, step 302 may be repeated for each of a plurality of notifications or events, with notifications sent for each event at a corresponding time. For example, in some implementations, a content provider may initially provide identifications of a series of events to each client device (e.g. event 1, 12:00:00; event 2, 12:00:10; event 3, 12:00:30, etc.). These identifications may be provided in advance of the events, and each client device may determine an offset for local timers based on a difference between a receipt time and a transmission time of the notifications. The client device may adjust each of the event times according to its computed offset (e.g. for a 2 second offset, adjustments of the times above would be event 1, 11:59:58; event 2, 12:00:08; event 3, 12:00:28, etc.), and may execute one or more local timers according to the adjusted times. In some implementations, to help ensure synchronization, the content provider may provide further notifications at each identified time. These further notifications, similar to those transmitted at step 302 discussed above, may include a transmission time or local time of the content provider. Each client device may compare a difference between the receipt time and transmission time of the further notification to its computed offset and adjust the offset (and the corresponding event times) as required. This allows for synchronization adjustments at faster rates than those possible with just an initial exchange of notifications. In some further implementations, if a client device does not receive the further notification from the server within a predetermined time from the expected time (e.g. based on the identified time, the computed offset, and, in some implementations, an additional buffer time in case of changing network conditions), the client device may transmit a request to the server for the further notification. This may allow for quick recovery of lost connections or notification packets, resynchronization, etc.

Accordingly, through implementations of the systems and methods discussed herein, server timers and local timers on client devices may be synchronized via notifications, and timer durations dynamically adjusted when client requests and responses are sent prior to client-side timer expiration, but received after server-side timer expiration, indicating communication latency has caused desynchronization. Timers may be adjusted on a global basis or per-client device basis, allowing the system to dynamically adjust between individual device latencies, ensuring overall synchronization and preventing unfairness favoring devices with lower round trip latency connections.

In one aspect, the present disclosure is directed to a method for multi-device synchronized communication. The method includes transmitting, by a server to a plurality of client devices via a plurality of network connections, a synchronization notification identifying an event and a corresponding future time, the identification comprising a transmission time, receipt of the identification causing each of the plurality of client devices to determine a local offset based on the transmission time and a corresponding receipt time, and execute a local timer based on the future time and the local offset. The method also includes initiating, by the server, execution of a server timer set according to the future time, responsive to transmission of the synchronization notification. The method also includes receiving, by the server, a first communication from a first client device prior to expiration of the server timer, the communication sent prior to expiration of the local timer of the first client device. The method also includes processing, by the server, the first communication from the first client device, responsive to receipt of the first communication prior to expiration of the server timer. The method also includes receiving, by the server, a second communication from a second client device after expiration of the server timer, the second communication sent prior to expiration of the local timer of the second client device. The method also includes discarding, by the server, the second communication from the second client device, responsive to receipt of the second communication after expiration of the server timer.

In some implementations, the method includes adding an offset to the predetermined duration based on a difference between a time of receipt of the second communication and the expiration of the server timer. In some implementations, the synchronization notification comprises a transmission time. In a further implementation, each of the client devices adjusts the local timer of said client device according to a difference between the transmission time of the synchronization notification and a local time. In some implementations, the method includes incrementing a counter value associated with the second client device, by the server, responsive to discarding the second communication from the second client device. In a further implementation, the method includes decrementing a counter value associated with the first client device, responsive to processing the first communication from the first client device. In a still further implementation, the method includes decrementing the counter value according to a value received from the first client device in the first communication. In some implementations, the method includes transmitting a second synchronization notification to each of the plurality of client devices, responsive to expiration of the server timer. In a further implementation, transmitting the second synchronization notification to each of the plurality of client devices causes at least one client device to adjust a corresponding local offset of the client device based on a difference between a transmission time of the second synchronization notification and a receipt time of the second synchronization notification by the client device.

In another aspect, the present disclosure is directed to a system for multi-device synchronized communication. The system may include a server comprising a processor, and a network interface in communication with a plurality of client devices via a plurality of network connections, each of the plurality of network connections having an associated latency. The processor may be configured to transmit a synchronization notification associated with a predetermined duration to each of the plurality of client devices, receipt of the synchronization notification causing each of the client devices to initiate execution of a local timer set to the predetermined duration. The processor may also be configured to initiate execution of a server timer set to the predetermined duration, responsive to transmission of the synchronization notification. The processor may also be configured to receive a first communication from a first client device prior to expiration of the server timer, the communication sent prior to expiration of the local timer of the first client device; and process the first communication from the first client device, responsive to receipt of the first communication prior to expiration of the server timer. The processor may also be configured to receive a second communication from a second client device after expiration of the server timer, the second communication sent prior to expiration of the local timer of the second client device; and discard the second communication from the second client device, responsive to receipt of the second communication after expiration of the server timer.

In some implementations, the processor is further configured to add an offset to the predetermined duration based on a difference between a time of receipt of the second communication and the expiration of the server timer. In some implementations, the synchronization notification comprises a transmission time. In a further implementation, receipt of the notification causes each of the client devices to adjust the local timer of said client device according to a difference between the transmission time of the synchronization notification and a local time.

In some implementations, the processor is further configured to increment a counter value associated with the second client device, responsive to discarding the second communication from the second client device. In a further implementation, the processor is further configured to decrement a counter value associated with the first client device, responsive to processing the first communication from the first client device. In a still further implementation, the processor is further configured to decrement the counter value according to a value received from the first client device in the first communication.

As discussed above, the systems and methods discussed herein may be used for synchronized content delivery. In some implementations of predictive content selection systems, content items may be selected for delivery based on requests from or characteristics associated with a single client device. However, with multiple client devices receiving the same content in synchronization, selecting content for delivery may become complex and unwieldy. In particular, selecting content that is relevant to equal proportions of the plurality of client devices may be unpracticable as the number of client devices increases.

Accordingly, the systems and methods discussed herein utilize a scoring system associated with each item of content and generate bundles or sets of content items having approximately corresponding scores (approximately corresponding referring to a first score a being within a predetermined range of a second score b, such as ±10%, ±15%, or ±20%, in many implementations, though other implementations may utilize other threshold values or percentages). Through such scoring and bundling, sets of content items that may be relevant to approximately an equal share of the recipient client devices may be selected and transmitted. Users of the client devices may select an item or set of content items of a plurality of sets of content items provided to the client devices, and the client devices may transmit identifications of the select sets back to the content provider, which may adjust scores or weights for further iterations of content selection via a machine learning process (e.g. neural network, logistic regression, Bayesian classifier, etc.). Thus, the client devices may provide feedback to reinforce or correct selection parameters, until the system selects sets of content items that are selected in approximately equal percentages.

Figure 4:
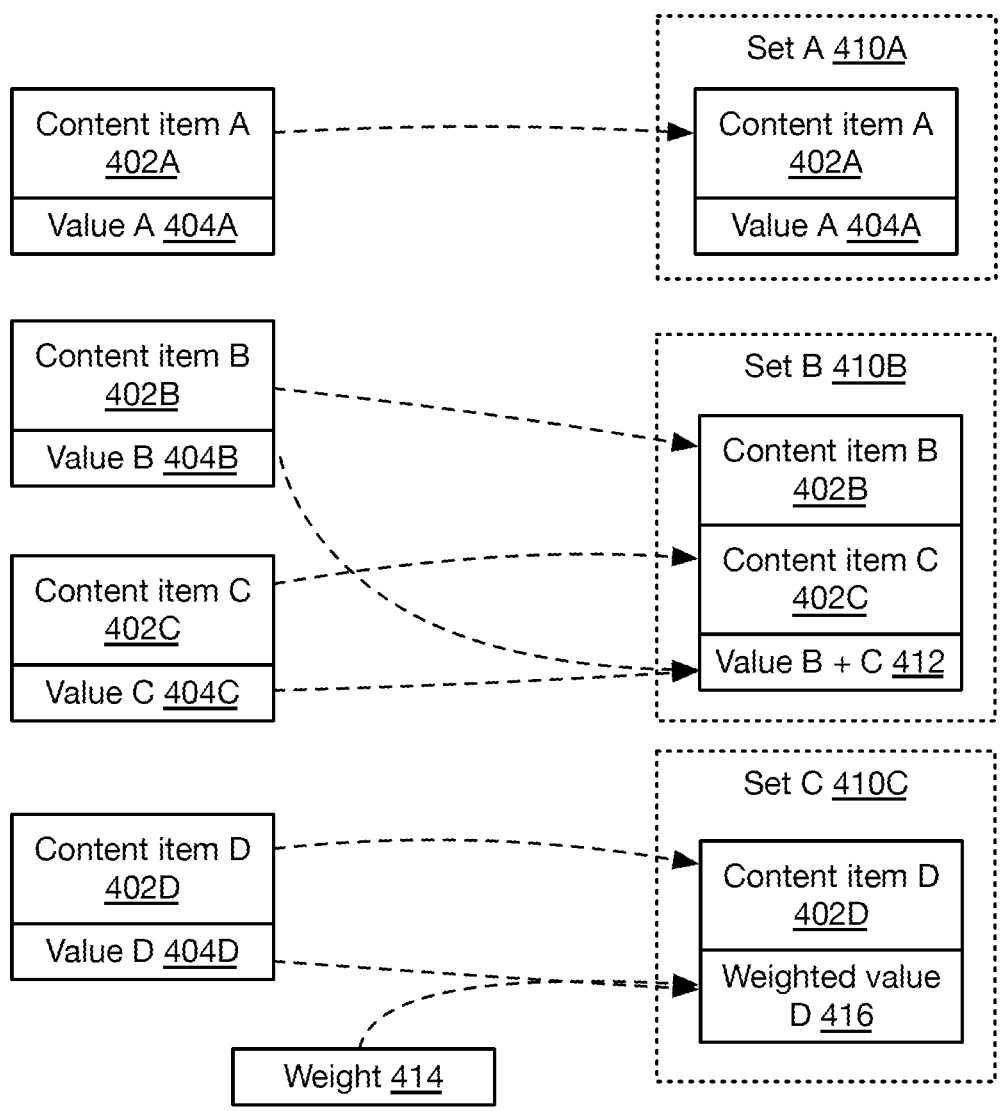
FIG. 4 is a logical diagram of an implementation of content selection for multi-client content delivery.

FIG. 4 is a logical diagram of an implementation of content selection for multi-client content delivery. Each content item 402A-402D may be associated with a value or score 404A-404D as shown. Scores may be predetermined or may be dynamically determined (e.g. based on previous iterations of providing content items to client devices and receiving feedback or selections). For example, if three content items are provided to client devices, and one content item is selected more than 33% of the time, then a score 404 corresponding to that content item may be increased (e.g. in proportion to the increased percentage, such as increasing the score by 10% if the content item is selected 43% of the time, or according to any other such proportion).

In many instances, scores or values 404 associated with content items 402 may be significantly different. In order to maintain approximately equal proportions of selections, content items may be bundled or grouped into a set 410A-410C, such that the total score for a set 410 (e.g. combination score 412) is approximately equal to the total score for each other set 410. For example, if content item A is initially selected (e.g. randomly, or by any other such means) and has an associated score 404A of 100, the system may place content item A into a first set A 410A, with an associated total score of 100 (e.g. score 404A). The system may identify a second content item 402B (e.g. randomly, or by any other means) and determine that it is associated with a score 404B of 70. The system may then search the content database for another content item having a score of approximately 30 (e.g. the difference between score 404A and score 404B). As discussed above, the system may search for an item having an associated score within a threshold percentage of the identified value, such as ±10%, 15%, or 20%. Upon finding such a content item, such as a third content item 402C with an associated score 404C of 32, the system may combine the second and third content items into a second set 410B, with an associated score equal to their combined scores 412.

Additionally, in some implementations, scores associated with content items may be approximately equal to a predetermined fraction of the score of the content item to match. For example, if the first content item has a score of 100 as discussed above, and a second content item has a score of 50 (approximately equal to ½ of the score of the first content item) or 67 (approximately equal to ⅔ of the score of the first content item), then in some implementations, the content item may be added to a set of its own (e.g. set C 410C) along with a weighting factor 414 equal to an inverse of the fraction (e.g. 200%, 150%, etc.), the set receiving a total score equal to the score for the content item 404D multiplied by the weighting factor 414. The weighting factor may be associated with a predetermined item of content, a token, a value for incrementing a counter associated with a client device, etc., or any other such factor that increases the perceived value of the associated content item.

Accordingly, each set 410A-410C may be associated with a corresponding score, and the scores may be approximately equal (e.g. within ±10%, ±15%, ±20%, or any other such threshold percentage, depending on implementation). The sets may be transmitted to client devices, and the client devices may transmit to the content provider a communication identifying a selected set. The content provider may then determine the percentages of selection of each of the sets, and in some implementations, may adjust scores of each content item according to a difference between a percentage corresponding to the selection of the set including the content item and an equal percentage (e.g. 100% divided by the number of sets).

Figure 5:
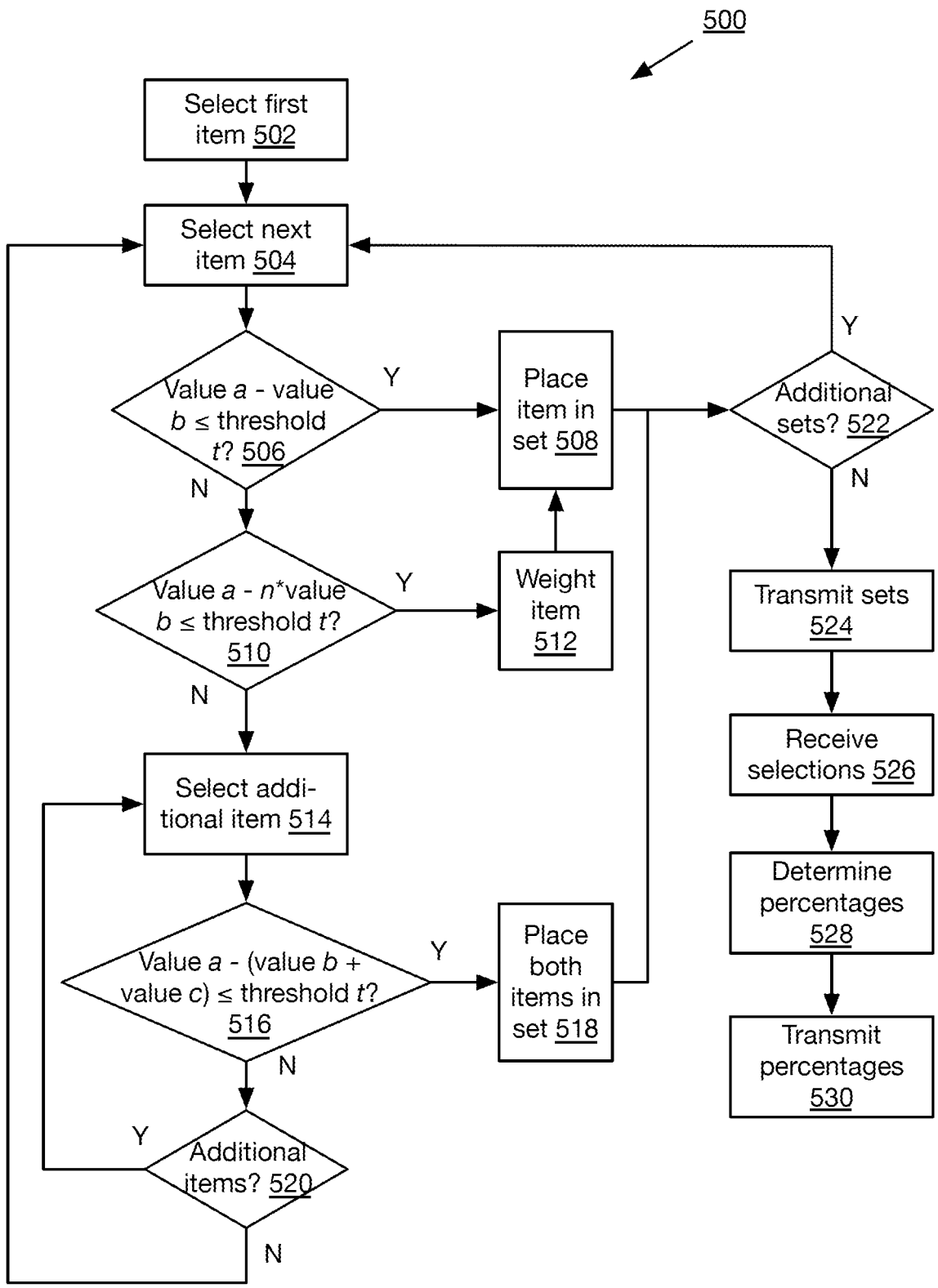
FIG. 5 is a flow chart of an implementation of a method for content selection for multi-client content delivery.

FIG. 5 is a flow chart of an implementation of a method 500 for content selection for multi-client content delivery. At step 502, a content provider may select a first content item from a content item database. The first content item may be selected randomly, may be selected based on having a highest associated score, may be selected in order (e.g. not recently selected), etc., or any other criteria. For example, in some implementations, the content items may represent active stocks, active players in a game, media items, or any other such content. The first content item may be placed in a "set" of its own, in some implementations.

At step 504, the content provider may select a next content item for comparison to the first content item. The next content item may be selected randomly, in order, or according to any other such criteria. At step 506, the content provider may compare a score associated with the first content item to a score associated with the next content item. If the scores are approximately equal—that is, if a difference between the scores a-b is less than a threshold t-then at step 508, the next item may be placed into a new set.

Conversely, if the scores are unequal, then at step 510, the content provider may determine if the score for the next content item is approximately equal to a predetermined fraction of the score for the first content item—that is, if a difference between the first score and the second score times a predetermined value (e.g. 1.5, 2, 2.5, etc.) is less than a threshold t. If so, then at step 512, the content provider may associate a weight with the next content item equal to the predetermined value, and at step 508, may place the weighted content item in a new set.

If the score does not correspond to a predetermined fraction of the score for the first content item, then at step 514, the content provider may select an additional content item (e.g. randomly, next in sequence, or by any other such criteria). At step 516, the content provider may determine if a sum of the scores of the next content item and additional content item are approximately equal to the score for the first content item (e.g. if the difference between the first score and the sum of the other two scores is less than a threshold t). If so, then at step 518, both the next content item and the additional content item may be placed into a new set. If not, then the content provider may determine at step 520 if additional content items are available in the database. If so, then steps 514-520 may be repeated for each additional content item until either finding an additional content item with a score that may be combined with the score for the next content item to approximately equal the score for the first content item; or exhausting the database. If no additional content items exist, then steps 504-520 may be repeated iteratively for each further next content item. In this manner, eventually every combination of content items may be tested if necessary (though in practice, this may be unlikely). Similarly, at step 522, the content provider may determine if enough sets have been generated. In many implementations, the content provider may generate a predetermined number of sets, such as three or four sets. If not enough sets have been generated, then steps 504-520 may be repeated.

Although shown in a particular sequence, in some implementations, or even on different iterations of steps 504-520, steps 506-508; 510-512; and 514-520 may be performed in different orders. For example, during a first iteration, the method may flow as illustrated in FIG. 5, while during a second iteration, the method may skip from step 504 to 514, or skip to 510. This may be done to ensure that some sets with multiple content items may be generated rather than completing set generation just via steps 506-508, in some implementations.

Once enough sets have been generated, then at step 524, the content provider may transmit the sets of content items to one or more client devices. Transmitting the sets of content items may comprise transmitting the content items themselves, transmitting a playlist of content items or identifications of each content item, transmitting a document including a link to each content item (e.g. uniform resource locator), transmitting an index number or other identifier of each content item (e.g. so that the client device may retrieve the content item from a local cache or content store), etc. The content items may be displayed or rendered by an application on the client device.

As discussed above, in many implementations, the application may be interactive, or allow a user of the device to select via an input device one of the content items or sets of content items. In such implementations, upon receiving a selection or interaction, the client device may transmit a communication identifying the selected set or content item to the content provider, which may be received at step 526. The content provider may aggregate such communications from client devices for a period of time (e.g. until expiration of a collection timer, until receiving a communication from each client device, etc.). Upon expiration of the period of time or upon receiving responses from each client device, at step 528 in some implementations, the content provider may determine the relative percentages each content item or set was selected by users. In some implementations, as discussed above, the content provider may adjust scores for each content provider according to a difference between these determined percentages and an even distribution (e.g. 1/# of content items or sets). In some implementations, the content provider may also provide these percentages to the client devices at step 530, e.g. for display or for training client side machine learning systems.

Accordingly, the systems and methods discussed herein provide a content selection system based on individual and aggregated scores for the content items, to generate bundles or sets of content items having approximately corresponding scores. Through such scoring and bundling, sets of content items that may be relevant to approximately an equal share of the recipient client devices may be selected and transmitted. Users of the client devices may select an item or set of content items of a plurality of sets of content items provided to the client devices, and the client devices may transmit identifications of the select sets back to the content provider, which may adjust scores or weights for further iterations of content selection via a machine learning process (e.g. neural network, logistic regression, Bayesian classifier, etc.). Thus, the client devices may provide feedback to reinforce or correct selection parameters, until the system selects sets of content items that are selected in approximately equal percentages.

In one aspect, the present disclosure is directed to a method for interdependent content selection. The method includes selecting, by a content server from a content database, a first content item for delivery to a plurality of client devices, the first content item associated with a first value. The method also includes selecting, by the content server from a plurality of additional content items in the content database, a second content item associated with a second value. The method also includes determining, by the content server, that the second value is less than the first value. The method also includes, responsive to the determination that the second value is less than the first value, selecting, by the content server from the content database, a third content item associated with a third value within a predetermined range of a difference between the first value and the second value. The method also includes transmitting, by the content server to the plurality of client devices, the first content item, the second content item, the third content item, and an identification of a set consisting of the second content item and third content item.

In some implementations, the method includes randomly selecting the second content item from the plurality of additional content items. In some implementations, the method includes selecting the second content item from a subset of the plurality of additional content items, each content item of the subset associated with a value less than the first value.

In some implementations, the method includes selecting, by the content server from the plurality of additional content items in the content database, a fourth content item associated with a fourth value; and determining, by the content server, that the fourth value is within a threshold percentage of a predetermined fraction of the first value. In a further implementation, the method includes, responsive to the determination that the fourth value is approximately equal to the predetermined fraction of the first value, associating, by the content server, the fourth content item with a weight value equal to the inverse of the predetermined fraction; and transmitting, by the content server to the plurality of client devices, the fourth content item and the associated weight value.

In some implementations, the method includes receiving, by the content server from each of the plurality of client devices, a selection of one or more content items; determining, by the content server, a percentage of client devices that selected each content item; and transmitting, by the content server to the plurality of client devices for display, the determined percentages. In a further implementation, the method includes transmitting a timer notification causing each client device of the plurality of client devices to initiate a local timer; and receiving the selection of one or more content items from each of the plurality of client devices is performed prior to expiration of the local timers.

In another aspect, the present disclosure is directed to a system for interdependent content selection. The system includes a content server comprising a processor, a network interface in communication with a plurality of client devices, and a memory device storing a content database comprising a plurality of content items, each content item associated with a value. The processor is configured to: select, from the content database, a first content item for delivery to a plurality of client devices, the first content item associated with a first value; select, from a plurality of additional content items in the content database, a second content item associated with a second value; determine that the second value is less than the first value; responsive to the determination that the second value is less than the first value, select, from the content database, a third content item associated with a third value within a predetermined range of a difference between the first value and the second value; and transmit, via the network interface to the plurality of client devices, the first content item, the second content item, the third content item, and an identification of a set consisting of the second content item and third content item.

In some implementations, the processor is further configured to randomly select the second content item from the plurality of additional content items. In some implementations, the processor is further configured to select the second content item from a subset of the plurality of additional content items, each content item of the subset associated with a value less than the first value.

In some implementations, the processor is further configured to select, from the plurality of additional content items in the content database, a fourth content item associated with a fourth value; and determine that the fourth value is within a threshold percentage of a predetermined fraction of the first value. In a further implementation, the processor is further configured to: responsive to the determination that the fourth value is approximately equal to the predetermined fraction of the first value, associate the fourth content item with a weight value equal to the inverse of the predetermined fraction; and transmit, via the network interface to the plurality of client devices, the fourth content item and the associated weight value.

In some implementations, the processor is further configured to receive, via the network interface from each of the plurality of client devices, a selection of one or more content items; determine a percentage of client devices that selected each content item; and transmit, via the network interface to the plurality of client devices for display, the determined percentages.

B. Computing and Network Environment

Having discussed specific embodiments of the present solution, it may be helpful to describe aspects of the operating environment as well as associated system components (e.g., hardware elements) in connection with the methods and systems described herein.

Figure 6A:
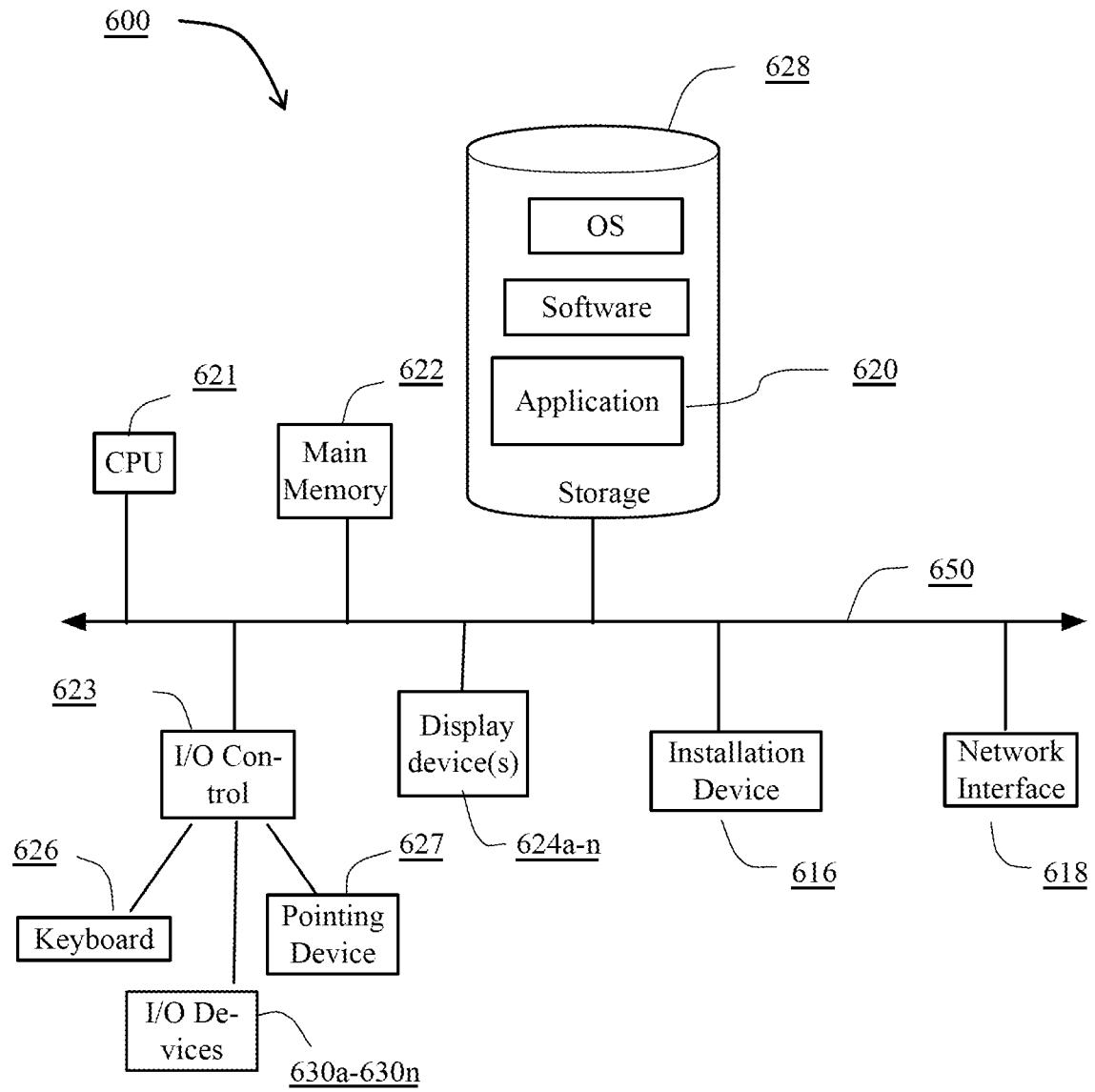
FIGS. 6A and 6B are block diagrams depicting embodiments of computing devices useful in connection with the methods and systems described herein.
Figure 6B:
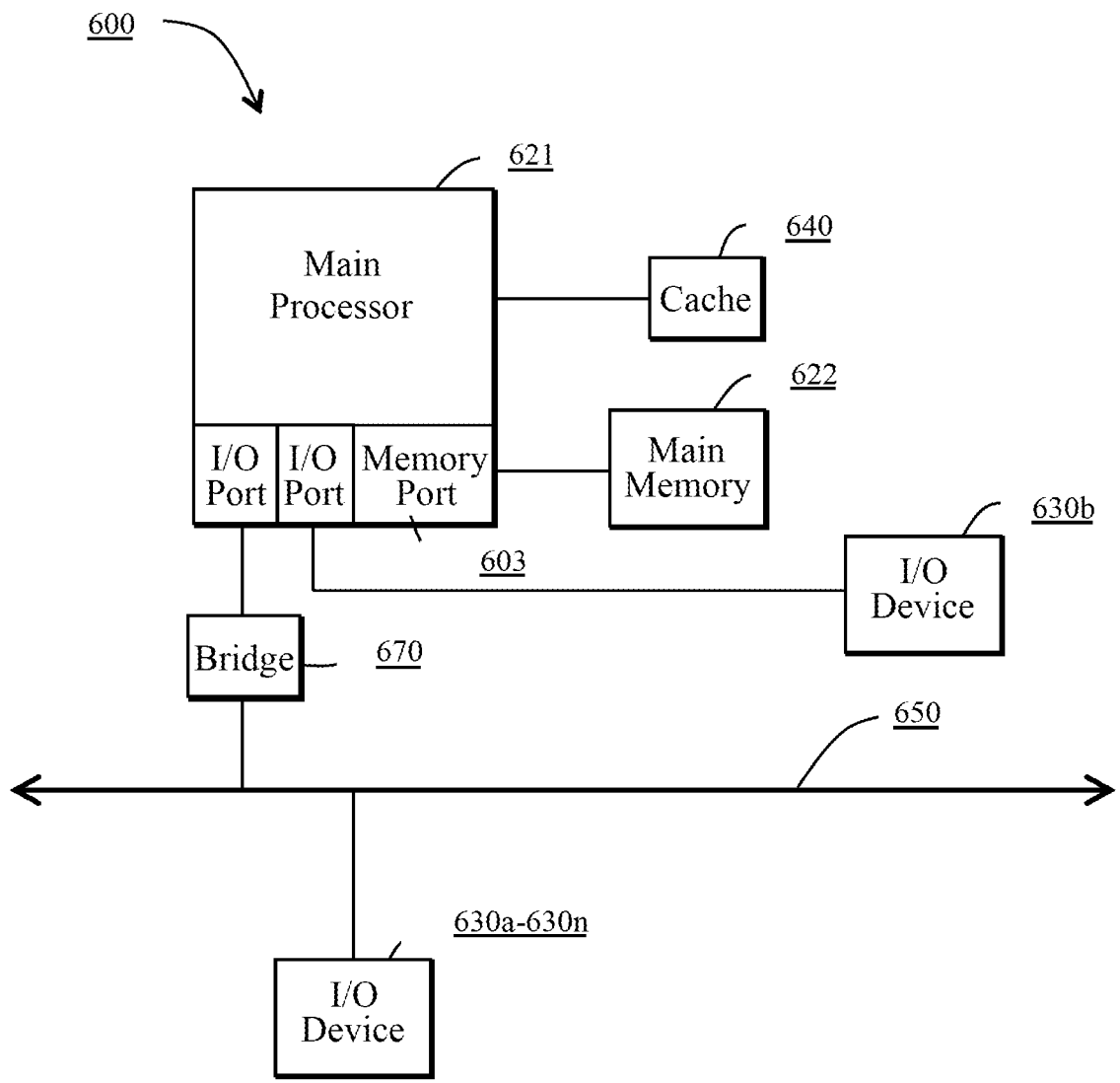

The systems and methods discussed above may be deployed as and/or executed on any type and form of computing device, such as a computer, network device or appliance capable of communicating on any type and form of network and performing the operations described herein. FIGS. 6A and 6B depict block diagrams of a computing device 600 useful for practicing an embodiment of the systems and methods discussed above. As shown in FIGS. 6A and 6B, each computing device 600 includes a central processing unit 621, and a main memory unit 622. As shown in FIG. 6A, a computing device 600 may include a storage device 628, an installation device 616, a network interface 618, an I/O controller 623, display devices 624a-624n, a keyboard 626 and a pointing device 627, such as a mouse. The storage device 628 may include, without limitation, an operating system and/or software. As shown in FIG. 6B, each computing device 600 may also include additional optional elements, such as a memory port 603, a bridge 670, one or more input/output devices 630a-630n (generally referred to using reference numeral 630), and a cache memory 640 in communication with the central processing unit 621.

The central processing unit 621 is any logic circuitry that responds to and processes instructions fetched from the main memory unit 622. In many embodiments, the central processing unit 621 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 600 may be based on any of these processors, or any other processor capable of operating as described herein.

Main memory unit 622 may be one or more memory chips capable of storing data and allowing any storage location to be directly accessed by the microprocessor 621, such as any type or variant of Static random access memory (SRAM), Dynamic random access memory (DRAM), Ferroelectric RAM (FRAM), NAND Flash, NOR Flash and Solid State Drives (SSD). The main memory 622 may be based on any of the above described memory chips, or any other available memory chips capable of operating as described herein. In the embodiment shown in FIG. 6A, the processor 621 communicates with main memory 622 via a system bus 650 (described in more detail below). FIG. 6B depicts an embodiment of a computing device 600 in which the processor communicates directly with main memory 622 via a memory port 603. For example, in FIG. 6B the main memory 622 may be DRDRAM.

FIG. 6B depicts an embodiment in which the main processor 621 communicates directly with cache memory 640 via a secondary bus, sometimes referred to as a backside bus. In other embodiments, the main processor 621 communicates with cache memory 640 using the system bus 650. Cache memory 640 typically has a faster response time than main memory 622 and is provided by, for example, SRAM, BSRAM, or EDRAM. In the embodiment shown in FIG. 6B, the processor 621 communicates with various I/O devices 630 via a local system bus 650. Various buses may be used to connect the central processing unit 621 to any of the I/O devices 630, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 624, the processor 621 may use an Advanced Graphics Port (AGP) to communicate with the display 624. FIG. 6B depicts an embodiment of a computer 600 in which the main processor 621 may communicate directly with I/O device 630b, for example via HYPERTRANSPORT, RAPIDIO, or INFINIBAND communications technology. FIG. 6B also depicts an embodiment in which local busses and direct communication are mixed: the processor 621 communicates with I/O device 630a using a local interconnect bus while communicating with I/O device 630b directly.

A wide variety of I/O devices 630a-630n may be present in the computing device 600. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 623 as shown in FIG. 6A. The I/O controller may control one or more I/O devices such as a keyboard 626 and a pointing device 627, e.g., a mouse or optical pen. Furthermore, an I/O device may also provide storage and/or an installation medium 616 for the computing device 600. In still other embodiments, the computing device 600 may provide USB connections (not shown) to receive handheld USB storage devices such as the USB Flash Drive line of devices manufactured by Twintech Industry, Inc. of Los Alamitos, California.

Referring again to FIG. 6A, the computing device 600 may support any suitable installation device 616, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 600 may further include a storage device, such as one or more hard disk drives or redundant arrays of independent disks, for storing an operating system and other related software, and for storing application software programs such as any program or software 620 for implementing (e.g., configured and/or designed for) the systems and methods described herein. Optionally, any of the installation devices 616 could also be used as the storage device. Additionally, the operating system and the software can be run from a bootable medium.

Furthermore, the computing device 600 may include a network interface 618 to interface to one or more networks through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 600 communicates with other computing devices 600' via any type and/or form of gateway or tunneling protocol such as Secure Socket Layer (SSL) or Transport Layer Security (TLS). The network interface 618 may include a built-in network adapter, network interface card, PCMCIA network card, card bus network adapter, wireless network adapter, USB network adapter, modem or any other device suitable for interfacing the computing device 600 to any type of network capable of communication and performing the operations described herein. The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

In some embodiments, the computing device 600 may include or be connected to one or more display devices 624a-624n. As such, any of the I/O devices 630a-630n and/or the I/O controller 623 may include any type and/or form of suitable hardware, software, or combination of hardware and software to support, enable or provide for the connection and use of the display device(s) 624a-624n by the computing device 600. For example, the computing device 600 may include any type and/or form of video adapter, video card, driver, and/or library to interface, communicate, connect or otherwise use the display device(s) 624a-624n. In one embodiment, a video adapter may include multiple connectors to interface to the display device(s) 624a-624n. In other embodiments, the computing device 600 may include multiple video adapters, with each video adapter connected to the display device(s) 624a-624n. In some embodiments, any portion of the operating system of the computing device 600 may be configured for using multiple displays 624a-624n. One ordinarily skilled in the art will recognize and appreciate the various ways and embodiments that a computing device 600 may be configured to have one or more display devices 624a-624n.

In further embodiments, an I/O device 630 may be a bridge between the system bus 650 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 600 of the sort depicted in FIGS. 6A and 6B may operate under the control of an operating system, which control scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 10, produced by Microsoft Corporation of Redmond, Washington; MAC OS and iOS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 600 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 600 has sufficient processor power and memory capacity to perform the operations described herein.

In some embodiments, the computing device 600 may have different processors, operating systems, and input devices consistent with the device. For example, in one embodiment, the computing device 600 is a smart phone, mobile device, tablet or personal digital assistant. In still other embodiments, the computing device 600 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 600 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A method, comprising:
   transmitting, by one or more processors coupled to memory, a content item to a client device, the content item corresponding to an event window of a live event, the event window corresponding to a server timer;
   receiving, by the one or more processors, from the client device, a communication corresponding to the content item, the communication transmitted within the event window as identified by the client device, the communication identifying a wager for the live event identified by the content item;
   determining, by the one or more processors, an offset to the server timer based on a difference between a receipt time of the communication and a transmission time of the communication;
   restricting, by the one or more processors, processing of the wager of the communication responsive to determining that the communication has arrived past an expiration of the server timer plus the offset; and
   updating, by the one or more processors, an account of the client device responsive to restricting processing of the wager of the communication.

2. The method of claim 1, wherein the transmission time of the communication is included in the communication.

3. The method of claim 1, wherein updating the account of the client device comprises adding, by the one or more processors, a value to a balance the account corresponding to the content item.

4. The method of claim 1, further comprising:
   transmitting, by the one or more processors, the content item to a second client device;
   receiving, by the one or more processors, a second communication from the second client device, the second communication transmitted within the event window as identified by the second client device; and
   processing, by the one or more processors, the second communication responsive to based on the second communication arriving within the expiration of the server timer plus a second offset.

5. The method of claim 4, further comprising updating, by the one or more processors, a second account of the client device by decrementing a balance of the second account by a value corresponding to the content item.

6. The method of claim 1, further comprising transmitting, by the one or more processors, a synchronization notification comprising a content transmission time of the content item, the synchronization notification causing the client device to:
   (i) determine a local offset based on the content transmission time and a corresponding receipt time of the synchronization notification; and
   (ii) execute a local timer based on the event window and the local offset.

7. The method of claim 6, further comprising transmitting, by the one or more processors, a second synchronization notification to the client device responsive to the expiration of the server timer.

8. The method of claim 1, further comprising selecting, by the one or more processors, the content item from a plurality of content items based on the live event.

9. The method of claim 8, wherein selecting the content item is further based on a respective value of the content item being less than a respective second value of a second content item of the plurality of content items.

10. The method of claim 1, further comprising:
    determining, by the one or more processors, a percentage of a plurality of client devices that selected the content item; and
    transmitting, by the one or more processors to the plurality of client devices for display, the percentage of the plurality of client devices that selected the content item.

11. A system, comprising:
    one or more processors coupled to non-transitory memory, the one or more processors to:
    transmit a content item to a client device, the content item corresponding to an event window of a live event, the event window corresponding to a server timer;
    receive, from the client device, a communication corresponding to the content item, the communication transmitted within the event window as identified by the client device, the communication identifying a wager for the live event identified by the content item;

determine an offset to the server timer based on a difference between a receipt time of the communication and a transmission time of the communication;

restrict processing of the communication responsive to determining that the communication has arrived past an expiration of the server timer plus the offset; and update an account of the client device responsive to restricting the processing of the communication.

12. The system of claim 11, wherein the transmission time of the communication is included in the communication.

13. The system of claim 11, wherein the one or more processors are to update the account of the client device comprises by performing operations comprising adding a value to a balance the account corresponding to the content item.

14. The system of claim 11, wherein the one or more processors are to:

transmit the content item to a second client device;

receive a second communication from the second client device, the second communication transmitted within the event window as identified by the second client device; and process the second communication responsive to based on the second communication arriving within the expiration of the server timer plus a second offset.

15. The system of claim 14, wherein the one or more processors are to update a second account of the client device by decrementing a balance of the second account by a value corresponding to the content item.

16. The system of claim 11, wherein the one or more processors are to transmit a synchronization notification comprising a content transmission time of the content item, the synchronization notification causing the client device to:

(i) determine a local offset based on the content transmission time and a corresponding receipt time of the synchronization notification; and (ii) execute a local timer based on the event window and the local offset.

17. The system of claim 16, wherein the one or more processors are to transmit a second synchronization notification to the client device responsive to the expiration of the server timer.

18. The system of claim 11, wherein the one or more processors are to select the content item from a plurality of content items based on the live event.

19. The system of claim 18, wherein the one or more processors are to select the content item further based on a respective value of the content item being less than a respective second value of a second content item of the plurality of content items.

20. The system of claim 11, wherein the one or more processors are to:

determine a percentage of a plurality of client devices that selected the content item; and transmitting to the plurality of client devices for display, the percentage of the plurality of client devices that selected the content item.

\* \* \* \* \*